W. C. Huntington,
Resawing Machine.
N° 21,200. Patented Aug. 17, 1858.
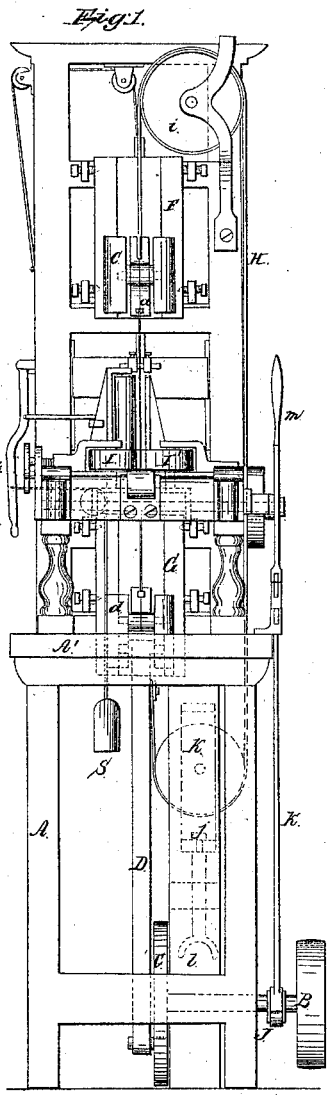
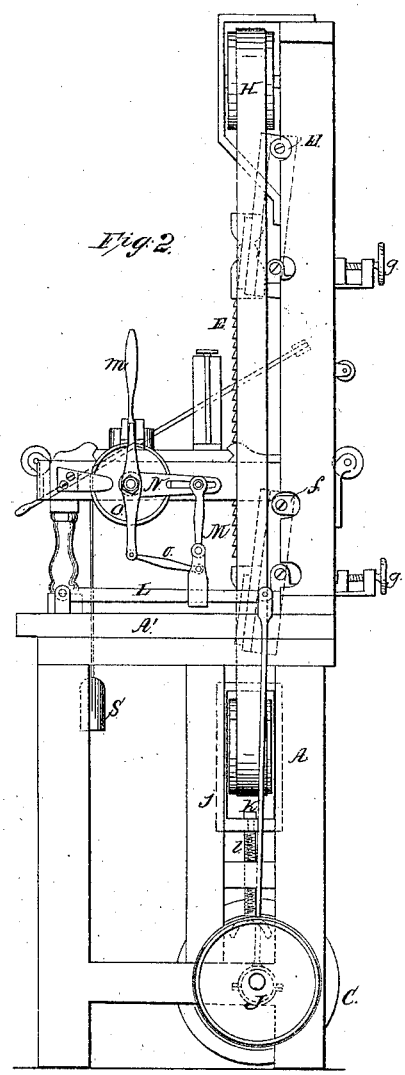
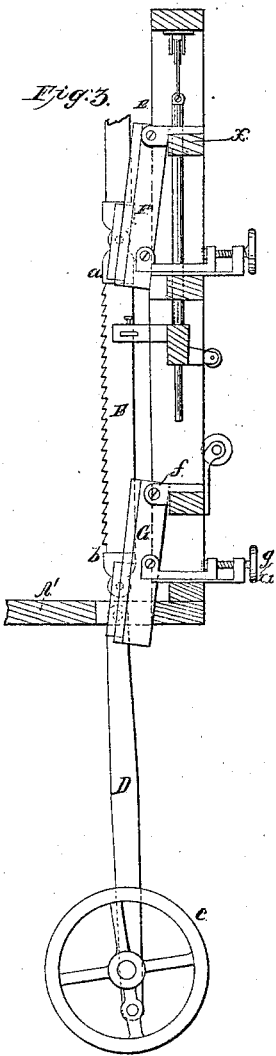
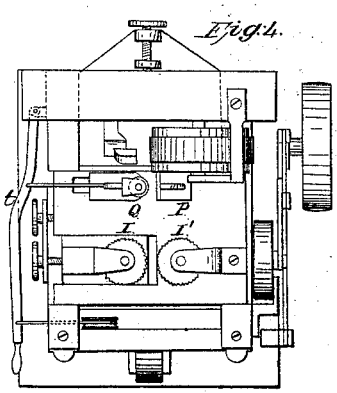
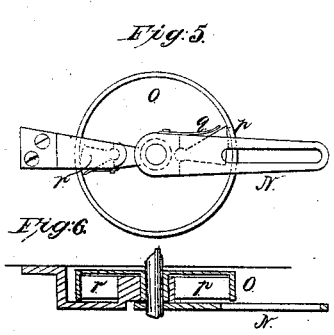
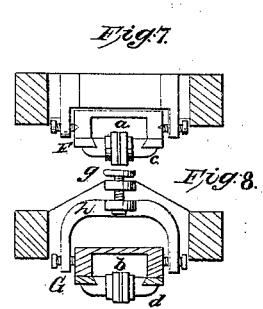

UNITED STATES PATENT OFFICE.

WILLIAM C. HUNTINGTON, OF NEWARK, NEW JERSEY.

RECIPROCATING SAWING-MACHINE FOR SAWING PLANKS.

Specification of Letters Patent No. 21,200, dated August 17, 1858.

*To all whom it may concern:*

Be it known that I, WILLIAM C. HUNTINGTON, of Newark, in the county of Essex and State of New Jersey, have invented certain new and useful Improvements in Machines for Sawing or Slitting up Planks and Boards; and I do hereby declare that the following is a full and exact description of the same, reference being had to the accompanying drawings, and to the letters of reference marked thereon, in which—

Figure 1 is a front and Fig. 2 a side elevation. Fig. 3 is a vertical section to show the operation of the saw guides. Fig. 4 is a plan. Fig. 5 is a plan and Fig. 6 a longitudinal section of the feed movement upon an enlarged scale. Fig. 7 is a transverse section of the upper saw guide, through the line $x$ Fig. 3, and Fig. 8 a similar view of the same through the line $x$ $x$ Fig. 3 to show the manner of suspending and adjusting the guides.

A is the frame and A′ the bed of the machine.

B is the driving shaft by which the saw is operated, C a crank wheel on the inner end of the shaft B; serving also as a balance wheel to steady the motion of the saw.

D is the pitman rod, connecting the saw to the crank pin in the crank wheel.

E is the slitting saw, of the usual form and construction, secured at its ends to the cheeks $a$, $b$, the cheeks being attached by pivots to the cross heads $c$, $d$, which work upon the guides F, G. The cheeks are attached to the cross heads by pivots to allow the guides to be placed out of a vertical line, and to allow the cross heads to work at the angle at which the guides are placed as hereinafter described. The guides are suspended from their upper ends by the pivots $e$, $f$, to allow their lower ends to be moved out of a vertical line—as shown in Fig. 3—and to be adjusted to any required position, for the purpose of giving to the saw an advancing movement as it descends equal to the depth of the cut to be made by it at each stroke, and an equal receding movement when it ascends, while its cutting edge moves in a vertical line, by the set screw $g$ and bridle $h$, shown in Figs. 7 and 8.

H is a tightening belt secured at its ends to the cheeks $a$, $b$, and working over the pulleys $i$, $j$, which tightens the saw and keeps it strained to prevent its buckling up, or bending when in motion and use. The pulley $j$ is suspended in the movable frame $k$, and the frame is adjusted by the tightening screw $l$, to give to the belt its required degree of strain to effect its purpose. The pivots on the cheeks $a$, $b$, allow the cheeks to adapt themselves to the different angles at which the guides may be placed as above described.

I I′ are a pair of feed rollers which press against each side of the board or plank being sawed, and move it foward under the saw. They are fluted or serrated vertically to give them a proper hold and are operated directly by the miter wheels shown in dotted lines in Fig. 1. The roller I is made to be adjustable to fit different thicknesses of lumber to be passed between the rollers. The movement of the feeding rollers is given by the eccentric J—placed on the driving shaft—through the connection K, lever L, connection M, lever N, and the disk O on the end of the shaft upon which the miter wheels before named are placed. The movement of the lever L is communicated to the disk O through the connection M, which is attached to the lever by a socket so that it can be moved to or from the vibrating end of the lever to increase or lessen the movement of the disk and through that to increase or lessen the degree of feed to be given to the lumber being sawed. The socket on the end of the connection M is moved upon the lever L, as stated, by the lever $m$ and connection $o$. The degree of feed can be further adjusted by moving the upper end of the connection M back or forth in the slotted aperture in the end of the lever N. The lever N vibrates upon the feed shaft before named, and has near its inner end the cam shaped dog $p$ pivoted to it— the dog having a sharp edge upon its longest extremity which catches in and against the inside of the flange of the disk O and moves the disk the distance that it is moved on the upward movement of the lever to which it is attached. On the downward movement of the lever named the dog slips over the flange—its grip and hold on the flange being released by the spring $g$, operating upon its upper side—and renews its hold when the lever is again moved upward. On the opposite side of the disk is placed another dog $r$ corresponding in form and operation to the one above named, but reverse in position, which releases its grip upon the flange of the disk when the other dog takes hold, and which takes hold when that releases its grip, for the purpose of holding the feed rollers against the pressure of the saw in cutting, during the time occupied in the downward movement of the lever N to sever the feed as named.

P is a guide against which the board or plank slides or moves to the saw; its distance from the line of the saw determining the thickness of the board to be slitted off from the plank or board being operated upon, that distance being susceptible of adjustment nearer to or farther from the line of the saw to make the board to be slitted off thicker or thinner as may be desired.

Q is a pressure roller which presses the plank or board being sawed against the guide P to keep the board steady and to insure the equal thickness of the part being slitted off—the pressure being indicated by the weight $o$ acting upon the lever $t$.

Ordinarily the feed given to the lumber being sawed and the cut, or advancing motion given to the saw require to be identical or nearly so, but in sawing through knotty lumber it is an advantage to decrease the amount of feed for the purpose of easing the action of the saw. This is readily effected by moving the connection M away from the vibrating end of the lever L to lessen the movement of the dog $p$, and the full feed is again as readily restored, after passing the knotty parts, by moving the connection outward to its first position.

The saw cheeks $a$, $b$, being connected to the cross heads $c$, $d$, by pivots, allow the cross heads to operate at any desired angle with the face of the saw without producing an undue strain or bearing either upon the cross heads or upon the guides on which they operate, and enable the cross heads to operate as perfectly at such angles as in a vertical line.

The superiority of the feed and retaining motions communicated by the cam shafted dogs operating upon the flange of the disk O as described over those communicated by the ratchet wheel and pawls ordinarily used consists in there being no lost motion either in the feed or in retaining the feed against the movement of the saw however much the feed may be varied so that the cut of the saw is uniform with the feed at all times.

I do not claim making the saw guides F, G, adjustable to different angles with the line of the cutting edge of the saw to give to the saw a greater or less amount of cut; nor do I claim making the feed adjustable to increase or lessen the amount of feed to be given to the lumber being sawed; nor do I claim a cam shaped dog for the purpose of alternately taking and releasing its hold to transmit an intermittent motion; nor do I claim straining and tightening the saw by attaching it to a tightening belt; but What I do claim as my invention and improvement and desire to secure by Letters Patent is—

1. Connecting the saw cheeks $a$, $b$ to the cross heads $c$, $d$, by pivots—when the saw is worked without a saw gate and is strained and tightened by being attached to a tightening belt, as and for the purpose set forth.

2. The combination of the cam shaped feeding and retaining dogs $p$ and $r$, operating in opposite directions to each other, with the flanged disk O, for the purpose of communicating a feed motion to the lumber being sawed, and retaining the lumber firmly in place while the saw is cutting it, as described.

WILLIAM C. HUNTINGTON.

Witnesses:
 George Low,
 M. Haskell.